United States Patent [19]
Sano et al.

[11] 3,801,331
[45] Apr. 2, 1974

[54] FRYING APPLIANCE

[75] Inventors: Yoshiaki Sano; Tomio Ishikawa; Yoshitaka Hirose; Yasumasa Mike, all of Osaka, Japan

[73] Assignee: Matsushita Electric Industrial Company, Limited, Kadome City, Japan

[22] Filed: Oct. 10, 1972

[21] Appl. No.: 296,048

[30] Foreign Application Priority Data
Apr. 17, 1972  Japan.............................. 47-38838

[52] U.S. Cl. .................................... 99/403, 55/257
[51] Int. Cl. ............................................. A47j 37/12
[58] Field of Search.............. 99/403, 404, 407–408, 99/417, 427; 98/115; 55/87, 90, 257, DIG. 30

[56] References Cited
UNITED STATES PATENTS

| | | | |
|---|---|---|---|
| 1,997,832 | 4/1935 | Portteus............................ | 99/403 X |
| 2,395,960 | 3/1946 | Clark et al............................. | 55/257 |
| 2,786,932 | 3/1957 | Lewis............................. | 99/403 UX |
| 2,952,764 | 9/1960 | Minami............................. | 99/403 X |
| 3,324,629 | 6/1967 | Graswich et al......................... | 55/87 |
| 3,403,498 | 10/1968 | Pasha...................................... | 55/90 |
| 3,463,077 | 8/1969 | Lescure ................................. | 99/403 |
| 3,618,587 | 11/1971 | Lee, Sr. ............................. | 99/403 X |
| 3,633,340 | 1/1972 | Illingworth...................... | 55/DIG. 30 |

*Primary Examiner*—Peter Feldman
*Assistant Examiner*—Arthur O. Henderson

[57] ABSTRACT

An improved frying appliance for frying foodstuffs, comprising a water-filled basin including a distributing disc having a plurality of openings therein and a spout providing communication between the space inside the basin with the atmosphere, a container for holding frying oil having a basket for receiving an article of food and a vent providing communication between the space inside the container and the space inside the basin so that fumes produced during frying operation are discharged through the vent into the water in the basin and are allowed to flow through the water in the form of bubbles, the bubbles being broken up into smaller bubbles as they float upward and squeeze their way into the openings of the distributing disc, and a lid arranged fluid-tightly on the rim of the container.

10 Claims, 5 Drawing Figures

FRYING APPLIANCE

This invention relates generally to a frying appliance, and specifically to an electrical frying appliance which utilizes water as a material for deodorizing unpleasant gaseous materials given off during frying operation.

Numerous types of frying appliances are known in the art and most of these appliances use porous materials such as active charcoal for the purpose of removing objectionable fumes and odours produced during frying operation. In the prior art appliances, the porous material is confined in a cartridge adapted in the frying appliance and fumes and odours are exhausted through the cartridge placed in the exhaust passage. While passing through the porous materials, objectionable gaseous materials are absorbed by the porous material through the surface attraction of the porosity of the material. However, excessive use of such material would cause blockage of the exhaust passage of the escaping fumes, and consequently, frequent changing of the porous material is necessary. This inevitably increases the total cost of the frying appliance.

It is, therefore, an object of the present invention to provide an improved frying appliance wherein the total cost of the appliance is kept at minimum.

Another object of the invention is to provide an improved frying appliance which can effectively absorb objectionable fumes and odours given off during frying operation.

A further object of the invention is to provide an improved frying appliance which utilizes water for absorbing objectionable fumes given off during frying operation.

These and other features of the invention will be more clearly understood by reference to the accompanying drawings in which.

Figure 1:
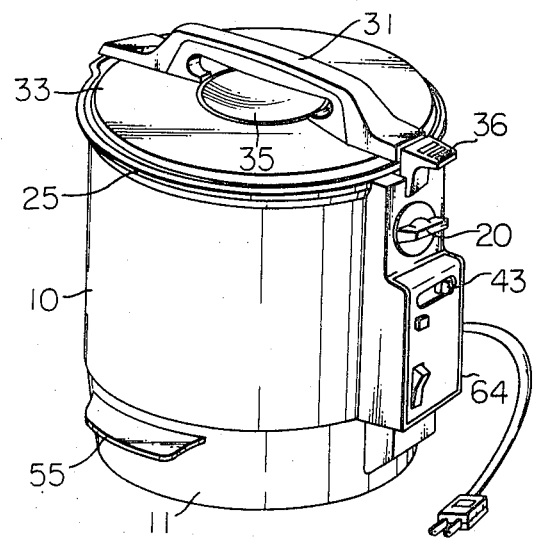
FIG. 1 is a top perspective view of a frying appliance according to the present invention with a lid placed in position for use.
Figure 2:
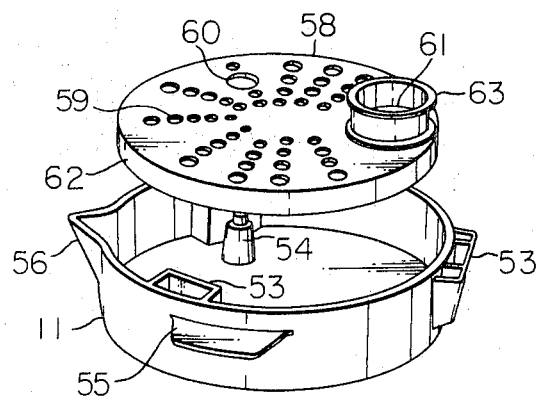
FIG. 2 is an exploded perspective view of the basin of the frying appliance with the distributing disc being shown in a disassembled position.
Figure 3:
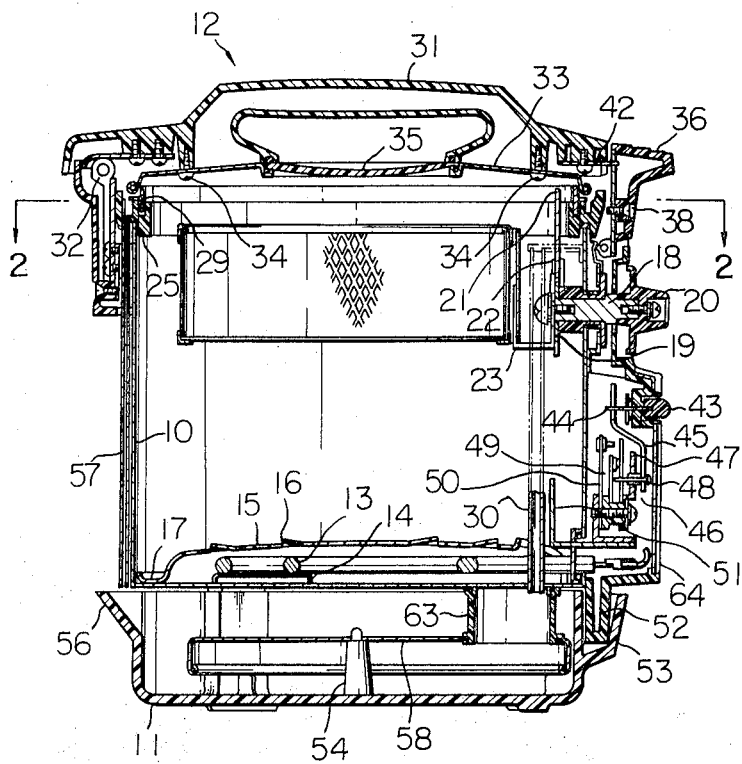
FIG. 3 is a sectional view of the frying appliance taken along line 1—1 in FIG. 5.
Figure 4:
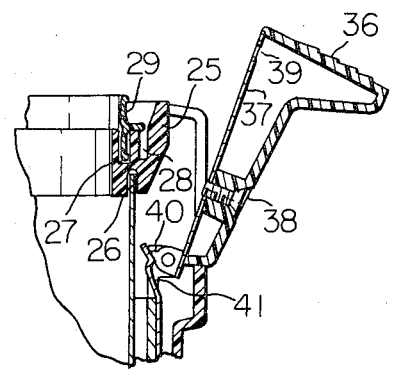
FIG. 4 is a sectional view of the manually operated lever portion of the present invention.
Figure 5:
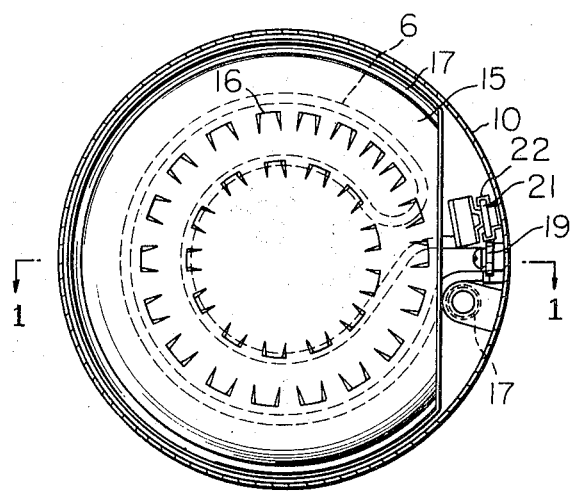
FIG. 5 is a sectional view of the frying appliance taken along line 2—2 in FIG. 3.

Briefly described, frying appliance of this invention has a container for holding frying oil which is detachably carried on a basin containing water, and a vent pipe for establishing communication between the space inside the container and the space inside the basin. Fumes and odours produced during cooking are led through the exhaust pipe and released into the water in the form of bubbles so that the fumes are cooled and dissolved into the water. The frying appliance of the invention further comprises a distributing disc arranged in the basing and having a plurality of openings therein so as to basin up the bubbles into smaller bubbles. This results in that the fumes sufficiently dissolve in the water. The plurality of openings of the disc may be arranged radially and the outer openings may have larger diameter than the inner ones.

Referring now to the accompanying drawings wherein like numerals indicate like parts throughout, there is shown a frying appliance according to the present invention. The frying appliance generally comprises a cylindrical container 10 for holding frying oil, a basin 11 arranged to carry thereon the container 10 for holding water to be utilized to absorb objectionable fumes and odours produced during frying operation, and a lid 12 placed in position for use over the container 10 for providing a fluid-tight chamber in the container 10. The container 10 which is, for example, made of stainless steel or aluminum sheet carries on its bottom an armored contoured electric heater 13 including a heating resistance of, for example, nichrome wire (not shown). The contoured heater 13 leads to the outside through the side wall of the container 10 to ensure the supply of electric current. The heater 13 may be spaced from the bottom of the container by means by a support member 14 so as to reduce the amount of heat dissipated from the bottom of the container 10. Overlying the heater 13 is a shielding plate 15 which is preferably dome-shaped and has a plurality of slots 16 preferably facing toward the edge of the shielding plate 15, and a gutter 17 formed on the peripheral edge portion of the plate 15, so that the heater 13 is favorably protected from the water droplets and slurry arising from the foodstuff which is being fried. A control shaft 18 is journaled at an upper portion of the side wall of the container 10 and carries at the inner end a pinion 19 and at the outer end a hand knob 20. The pinion 19 meshes with a rack 21 vertically slidably mounted on a guide member 22 fastened on the side wall of the container 10. On the rack 21 is fastened a U-shaped support member 23 on which a basket 24 for holding an article of food is detachably mounted. The basket 24 is desiredly raised or lowered by manually turning the knob 20. A flange 25 made of a heat-resistive plastic is removably mounted on the rim 26 of the container 10. A pair of grooves 27 and 28 are formed on the upper surface of the flange 25. A gasket 29 made of a heat-resistive elastic material such as silicon rubber is snugly fitted into the groove 27. A vent pipe 30 is fastened to the inner side wall of the container 10 in such a manner as to vertically extend in the vicinity of the inner side wall. The upper end of the vent pipe 30 is positioned adjacent the rim 26 and the lower end of the pipe 30 extends through an opening in the bottom of the container. The container 10 is further provided with a pair of legs 52 on the lower side of its bottom.

The lid 12 includes a handle member 31 pivotally mounted at one end thereof to a support member 32 secured to the outer wall of the container 10 and a dome-shaped cover member 33 secured to the handle 31 by means of screw members 34. The cover member 33 has on its edge a circular wall bent downwardly and outwardly so that the cover member 33 is brought into air-tight contact with the gasket 29 when the lid is placed in the closed position. The cover member 33 may have at the central portion thereof a window paned with a transparent dome-shaped member 35 to make the foodstuff visible from the outside. The handle 31 has a central portion bridging the window 35 and the other end thereof so arranged as to engage a manually operated lever 36. The manually operated lever 36 is made of plastic and is provided with a metal plate 37 secured to the lever 36 by a screw member 38. The metal plate 37 has therein an opening 39 adjacent the upper end thereof and a cam 40 at the lower end thereof. The cam 40 is pivotally mounted to a support member (not shown) secured to the side wall of the container 10 and engages a leaf spring 41 when the lever 36 is pushed toward the lid 12. In this instance, with the lid placed in the closed position, the manually operated lever 36 is moved to a position so that the opening 39 receives a projection 42 secured to the open side of the handle 31 so as to put the lid 12 in the locked condition.

On the outer side wall of the container 10 and adjacent the lower end of the lever 36 is mounted a housing 64 of a moulded plastic. On the outer side wall of the housing 64 is slidably mounted a temperature control knob 43 provided with a bar or rod 44 having an opening at its extremity. In the housing 64, the upper end of a guide member 45 is slidably received through the opening and the lower end of the guide member 45 is pivotally secured to a support member 46 of a thermostat 47 by a screw member 48. The thermostat 47 has a pair of contacts 49 and a bimetal contact 50 connected to a temperature sensing element 51 extending fluid-tightly into the container 10. The slidable movement of the control knob 43 will cause the adjusting screw 48 to move axially toward or away from the contacts 49 so that the position of the contacts 49 is varied accordingly with respect to the bimetal 50. The housing also has a leg 52 extending downwardly therebeneath.

The basin 11 may be a moulded plastic and is provided with a plurality of recesses 53 so arranged on the inner side wall of the basin 11 as to receive the legs 52 so that the container 10 is securely carried on the basin 11. The basin has also therein a boss 54 formed on the bottom thereof, a pair of handles 55 and a spout 56 adjacent the upper end thereof confronting the lower end of a duct 57 provided on the outer side wall of the container 10. In the basin there is situated a distributing disc 58 having a plurality of smaller openings 59, a medium opening 60 and a larger opening 61 and a circular rim 62 on the edge thereof extending vertically and downwardly. The smaller openings 59 may be preferably arranged radially and have diameters differing so that the outer openings have a larger diameter than the inner ones. A cylinder 63 preferably of rubber or the like is fitted in the larger opening 61 at the lower end thereof. The upper end of the cylinder 63 is brought into intimate contact with the lower side of the bottom of the container 10 and generally in alignment with the vent pipe 30 when the distributing disc 58 is situated in the basin so that the boss 54 is received through the medium opening 60.

In operation, the basket 24 is filled with an article of food: the lid 12 is placed on the container: the basin 11 is filled with water: and the container is placed in position on the basin. Then the current is passed through the heater 13 to heat up the frying oil. When the frying oil is heated up the basket 24 is lowered by means of the hand knob 20 so that the foodstuff is immersed into the hot frying oil. During frying operation, fumes produced in the container are exhausted through the vent pipe 30 into the water in the basin 11, and are allowed to float up in the form of bubbles and broken up into smaller bubbles by means of the distributing disc 58 as they squeeze their way through the openings 59. Since the openings 59 are so arranged that the outer openings have larger diameter than the inner ones as described before, the bubbles are distributed uniformly throughout the basin. This arrangement aids in increasing the entire surface area of the bubbles and thus increases the efficiency of deodorization. The deodorized air is then allowed to escape through the spout 56 out into the atmosphere. Slurry arising from the foodstuff will build up on the upper surface of the shielding disc 58 so as to reduce the need for cleaning the bottom of the container. Water droplets arising from water-containing foodstuff will be collected in the gutter 17: if the shielding disc 58 is not provided, the water-droplets would be violently evaporated upon contact with the heater 13, thus causing a bumping in the frying oil.

Although the present embodiment employs the manually operated lever 36 for holding the lid in the locked position so as to overcome the inside air pressure, this lever may be dispensed with if a lid having a weight sufficient to overcome the air pressure is used instead. In addition, the water-containing basin may be constructed as a separate unit which can be placed anywhere outside the frying appliance if the vent pipe is flexible and has an appropriate length.

All modifications of the present embodiment will be apparent to those skilled in the art without departing from the scope of the present invention. Therefore, the present embodiment is only illustrative and not restrictive.

What is claimed is:

1. A frying appliance comprising: a basin for holding water and including means for communication between the inside thereof with the atmosphere; a container for holding frying oil, closure means for fluid-tightly sealing said container; a heating arrangement for applying heat to said frying oil; and vent means arranged to provide communication between the space inside said container and the space inside said basin, whereby fumes emanated from the foodstuff during cooking are led through said vent means and dissolve in said water.

2. A frying appliance as claimed in claim 1, wherein said basin includes a distributing disc having a plurality of openings therein.

3. A frying appliance as claimed in claim 2, wherein said openings are arranged radially, the diameter of said openings increasing radially toward the periphery of said disc.

4. A frying appliance as claimed in claim 1, wherein said heating arrangement includes an electric heater positioned on the lower portion thereof and a shielding plate overlying said heater so as to prevent said heater from contacting with water droplets created by water-containing foodstuff.

5. A frying appliance as claimed in claim 4, wherein said shielding plate is upwardly concave shaped and provided with an annular groove formed around the edge thereof so as to receive said water droplets in said groove.

6. A frying appliance as claimed in claim 5, wherein said shielding plate has a plurality of slots, said slots facing substantially horizontally outwardly and radially arranged on said shielding plate.

7. A frying appliance as claimed in claim 1, wherein said closure means has a lid including an arcuate surface so as to drain off the water condensed inside of said surface toward its periphery and a concave transparent member adapted in the central portion thereof.

8. A frying appliance as claimed in claim 1, wherein said container has a rim thereon and a plurality of grooves on said rim and a vertically extending conduit pipe arranged adjacent the outer wall of said container, said conduit pipe being in communication at one end with one of said grooves for discharging the condensed water into said basin.

9. A frying appliance as claimed in claim 8, wherein said basin includes a spout confronting the other end of said conduit pipe so as to receive said discharged water.

10. A frying appliance as claimed in claim 1, wherein said basin carries laterally extending handles formed on the outer side thereof and is arranged to be detachable from said container.

* * * * *